May 16, 1967        J. M. HORN        3,319,643
PRESSURE SURGE SUPPRESSOR
Filed Dec. 28, 1964
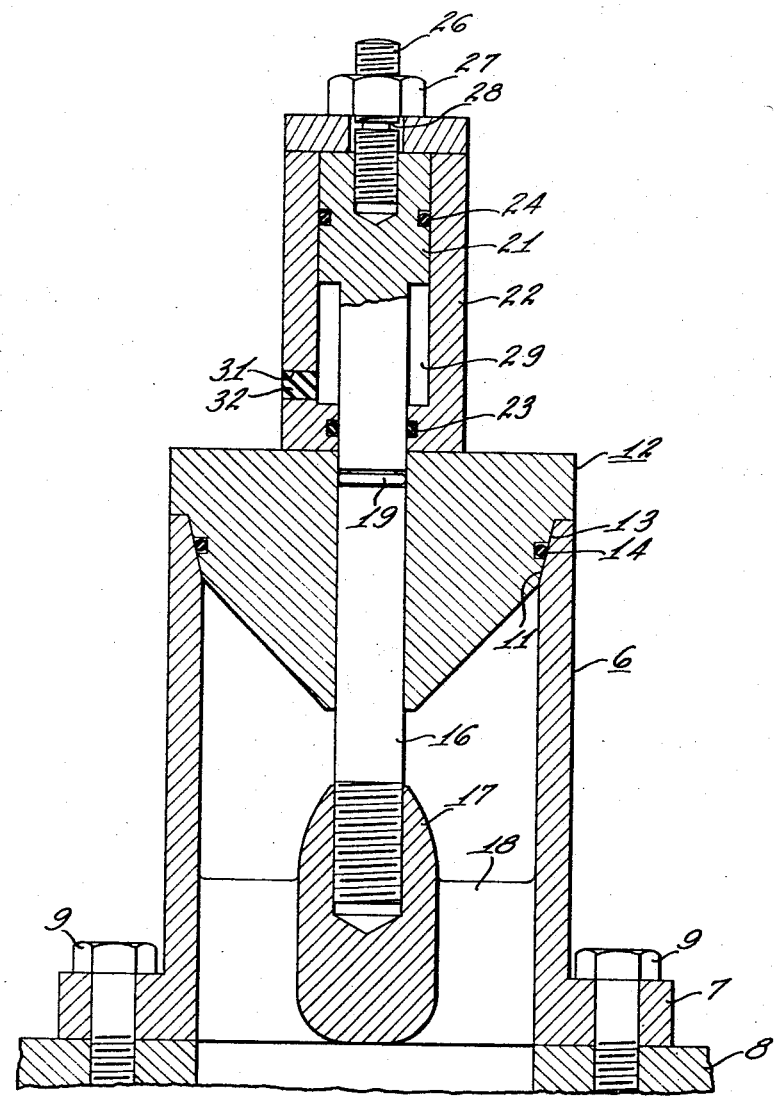
Inventor
John M. Horn
By John P. Hines
Attorney 3,319,643
PRESSURE SURGE SUPPRESSOR
John M. Horn, York, Pa., assignor to Allis-Chalmers
Manufacturing Company, Milwaukee, Wis.
Filed Dec. 28, 1964, Ser. No. 421,514
2 Claims. (Cl. 137—70)

This invention pertains in general to a pressure limiting device, and more particularly to a device for suppressing pressure surges in large water vessels as, for example, hydraulic turbines.

In hydraulic turbines, large amounts of water are contained under considerable pressure. It is the practice to provide some form of pressure relieving device in the event the pressure exceeds a safe value. Conventional pressure release valves which open when a particular pressure is exceeded are not acceptable under these conditions because of the large amount of water involved. If this water is suddenly released, very high pressure surges would result. It is desirable and in some cases necessary, to limit or prevent these pressure surges.

It is the intention and general object of this invention to provide a valve which will handle large amounts of water which have exceeded a desired pressure maximum and which will overcome pressure surging.

A more specific object of the subject invention is to provide a surge suppressing valve which slowly opens as the pressure maximum has been exceeded.

A more specific object of the subject invention is to provide a surge suppressing valve which opens a large orifice slowly to its maximum position when the pressure maximum has been exceeded without requiring an additional increase in pressure.

These and other objects of the subject invention will become more fully apparent as the following description is read in light of the attached drawing, wherein:

FIG. 1 is a cross sectional view through a valve constructed in accordance with the invention.

Referring to the drawing, a valve housing, generally designated 6 will conveniently be constructed in the form of a cylinder and be provided with an annular mounting flange 7 having circumferentially spaced mounting holes provided therein. The valve body may be connected to a high pressure source, such as a pen stock of a hydraulic turbine indicated generally at 8. Any convenient means of connection may be provided and herein the connection is shown consisting of cap screws 9 passed through the circumferentially spaced openings in the flange 7 and rigidly connected to the pen stock 8.

The opposite end of the valve housing 6 may be provided with an annular tapered seat 11. The free end of the valve housing is closed with a plug generally designated 12. This plug has a complementary tapered seat 13 thereon which as herein shown mates with the annular tapered seat of the valve housing. To further insure an adequate seal between the valve housing and the plug, an O-ring 14 may be provided between the mating tapered seats.

A piston rod 16 has one end thereof rigidly connected to the valve housing. This connection may be provided in any convenient manner and is herein shown as comprising a threaded connection between a threaded end of the piston rod and an internally threaded boss 17. This boss 17 may be supported within the valve housing 6 by radially connected spider legs 18 which are rigidly connected to the interior surface of the valve housing.

The piston rod 16 may extend through an opening provided in the plug 12. In order to insure a fluid seal between the plug and the piston rod, an O-ring 19 is provided in a slot formed in the piston rod. A piston 21 is connected to the other end of the piston rod 16 in any conventional manner, and is herein shown formed integrally with the piston rod. This piston 21 is contained within a valve body 22 and is adapted for sliding movement therein. In order to insure a seal between the piston rod and the valve body 22, an O-ring seal 23 may be provided. Furthermore, to insure a seal between the piston 21 and the valve body 22, an additional O-ring seal 24 may be provided.

An axially directed threaded bore may be provided in the free end of the piston 21. A threaded stud 26 is received within the threaded bore. This stud may extend to the exterior of the valve body 22 and be connected thereto in any conventional manner such as by a nut 27. Between the nut 27 and the piston 21, the stud 26 is provided with a machined groove 28. The root of the groove 28 is precisely dimensioned so that the stud will break under a predetermined load as pressure builds up in the valve housing 6.

The piston 21 is so dimensioned relative to the interior size of the valve body 22 that an annular fluid containing chamber 29 is defined within the valve body on the side of the piston adjacent the plug 12. A metering orifice 31 is provided through the valve body 22 into this annular chamber 29. This metering orifice is closed under normal conditions by means of a plug 32.

In operation under normal conditions of pressure, the plug 12 is held firmly in watertight engagement with the valve housing 6 by means of the stud and nut connection at the end of the piston 21. However, when the predetermined pressure is exceeded, force exerted on the plug 12 is transmitted through the valve body 22 and nut 27 to the stud 26. Because of the machined groove 28 in the stud, the stud will rupture as the predetermined pressure is reached. At this point the plug 12 attempts to move outward, forcing the valve body 22 with it. This causes a compression of the fluid in the annular chamber 29 which immediately forces the plug 32 out of the metering orifice. The plug 12 then moves upward at a predetermined rate determined by the amount of fluid which can be forced through the metering orifice 31.

With this arrangement, it can be seen that sudden pressure surges are overcome because there is a timed opening of the plug 12. Furthermore, because of the tapered seat connection between the plug 12 and valve housing 6, a small amount of water is initially permitted to pass therebetween and this amount is slowly and continuously increased until the plug has completely opened relative to the valve housing.

An additional advantage of this particular type of surge suppressor is the fact that once the predetermined pressure has been reached, the vlave will slowly open to its maximum amount without requiring an additional increase in pressure. Additional increase in pressure is required under circumstances where a spring is utilized to resist quick opening of the plug. As the spring is compressed, additional pressure is required to further compress it, permitting complete opening of the plug.

Although only one embodiment of the subject invention has been herein shown and described, it will be obvious to others skilled in the art that other modifications are possible, and all such modifications that come within a reasonable interpretation of the appended claims are intended to be covered.

The embodiments of the invention in which an exclusive property or privilege is claimed are defined as follows:

1. A valve for suppressing high pressure fluid surges comprising: a valve housing having one end thereof connected to a source of high pressure fluid; a plug in the other end of said housing; a valve body member; a piston member contained for sliding movement within said valve body and defining therewith a fluid containing chamber, one of said members connected to said valve housing and the other of said members engaging said plug; means connecting said piston to said valve body in a manner to hold said plug in fluid sealing engagement with said housing, said means having a portion adapted to rupture at a predetermined force as imposed by fluid pressure on said plug; a metering orifice through the wall of said valve body opening into said fluid chamber, said orifice being of a size to permit escape of fluid from said chamber at a predetermined rate as said members move relative to one another; and a plug in said orifice adapted for expulsion therefrom at a predetermined fluid pressure in said chamber.

2. A valve for suppressing high pressure fluid surges comprising: a valve housing having one end thereof connected to a source of high presusre fluid; a plug in the other end of said housing; a valve body engaging said plug; a piston contained for sliding movement within said valve body and defining therewith a fluid containing chamber in the end of said body adjacent said plug, said piston being rigidly connected to said valve housing; means connecting said piston to said valve body in a manner to hold said plug in fluid sealing engagement with said housing, said means having a portion adapted to rupture at a predetermined force as imposed by fluid pressure on said plug; a metering orifice through the wall of said body opening into said fluid chamber, said orifice being of a size to permit escape of fluid from said chamber at a predetermined rate as said valve body moves relative to said piston; and a plug in said orifice adapted for expulsion therefrom at a predetermined fluid pressure in said chamber.

References Cited by the Examiner

UNITED STATES PATENTS

| 815,236 | 3/1906 | Trump | 137—70 |
| 1,796,200 | 3/1931 | Grieshaber | 137—70 X |

WILLIAM F. O'DEA, *Primary Examiner.*

D. R. MATTHEWS, *Assistant Examiner.*